United States Patent [19]

Fachini et al.

[11] 4,417,230

[45] Nov. 22, 1983

[54] GUIDE WHEEL ANGLE INDICATOR

[75] Inventors: Robert M. Fachini, Naperville, Ill.;
William D. Lester, Memphis, Tenn.

[73] Assignee: International Harvester Co.,
Chicago, Ill.

[21] Appl. No.: 251,553

[22] Filed: Apr. 6, 1981

[51] Int. Cl.³ ............................................. B60Q 1/00
[52] U.S. Cl. ............................... 340/52 R; 200/61.27;
200/52 R
[58] Field of Search ................. 116/31, 283, 50, 35 R;
340/67, 66, 52 R, 686, 73, 684; 200/61.27, 52 R,
61.88, 61.89, 61.90, 61.91, 61.3, 61.31, 61.33

[56] References Cited

U.S. PATENT DOCUMENTS

| | | | |
|---|---|---|---|
| 1,582,069 | 4/1926 | Nanna | 340/73 |
| 1,919,206 | 7/1933 | Douglas | 200/61.91 X |
| 2,407,934 | 9/1946 | Nilson | 200/59 |
| 2,934,035 | 4/1960 | Hardy | 116/31 |
| 2,957,442 | 10/1960 | Coon | 116/31 |
| 3,103,909 | 9/1963 | Anderson | 116/31 |
| 3,540,028 | 11/1970 | Love | 340/52 R |
| 3,611,286 | 10/1971 | Cleveland | 340/61 |
| 3,673,561 | 6/1972 | Bronstein | 340/52 R |
| 3,900,831 | 8/1975 | Houseman et al. | 340/52 R |
| 4,187,923 | 2/1980 | McClure et al. | 116/31 |
| 4,198,921 | 4/1980 | Horton | 116/283 |
| 4,245,139 | 1/1981 | Orscheln et al. | 200/52 R |

FOREIGN PATENT DOCUMENTS

| | | | |
|---|---|---|---|
| 52-77330 | 6/1977 | Japan | 340/52 R |
| 626867 | 7/1949 | United Kingdom | 200/52 R |

*Primary Examiner*—S. Clement Swisher
*Assistant Examiner*—Tom Noland
*Attorney, Agent, or Firm*—Boris Parad; F. David Au Buchon

[57] ABSTRACT

An indicator system connected with a guide wheels steering hydraulic cylinder and informing a vehicle operator about the guide wheel angular position relative to the vehicle rectilinear travel direction under any weather, terrain or light conditions. Right and left contact plates located along one selection of the outer surface of the cylinder are contacted by a contact arm moving with the piston rod of the cylinder. Since the rod reciprocates depending on the direction of turning the contact is used to complete a circuit lighting a left or right turn lamp, thus indicating when a predetermined turn angle is exceeded in either direction.

12 Claims, 5 Drawing Figures

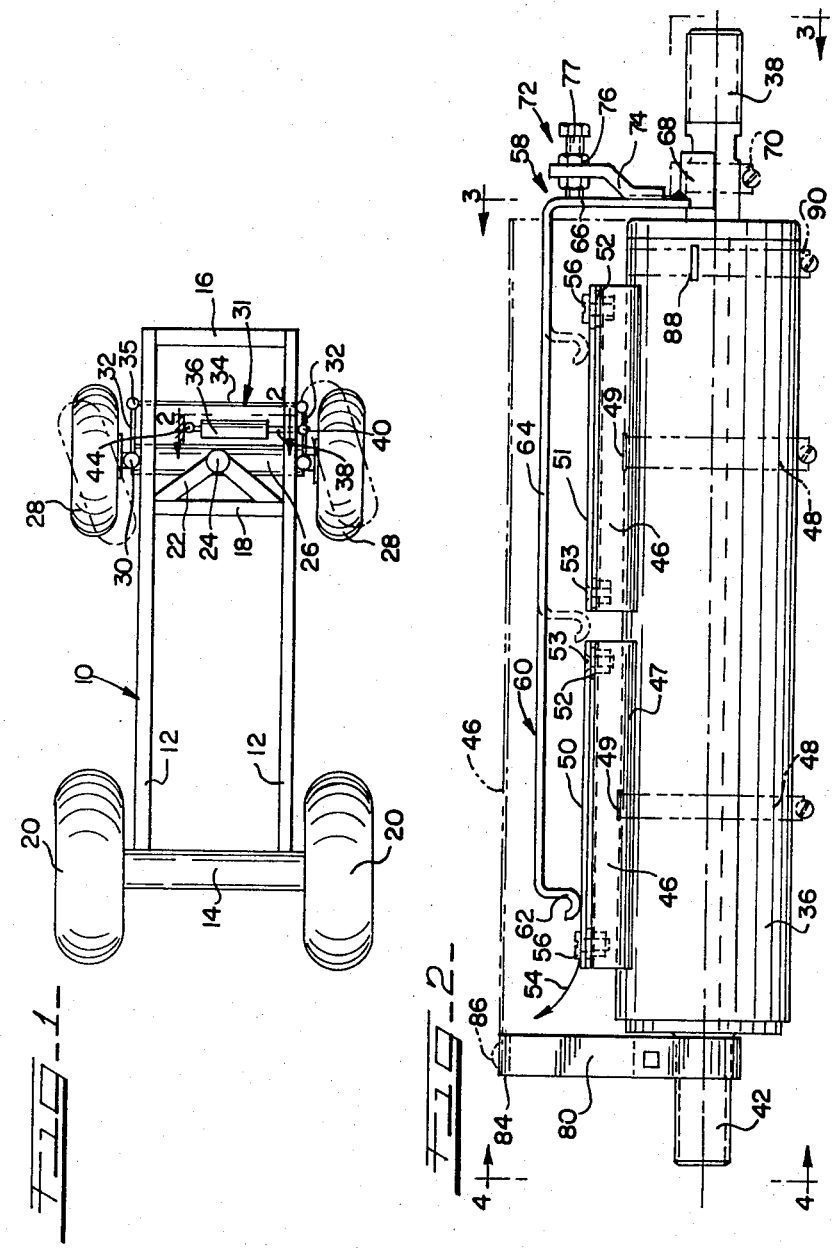

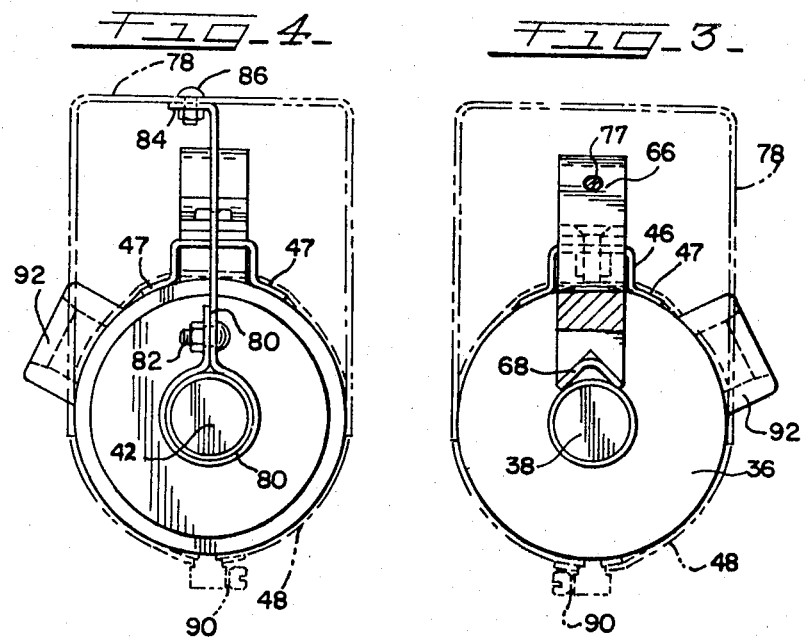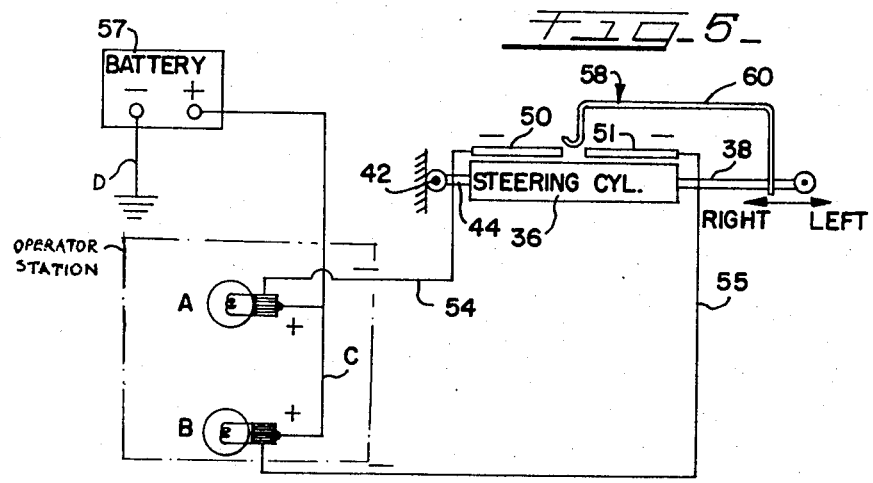

GUIDE WHEEL ANGLE INDICATOR

BACKGROUND OF THE INVENTION

1. Field of the Invention:

This invention relates to indicator systems and more particularly to a guide wheel indicator system monitoring a guide wheel angular position relative to the vehicle rectilinear travel direction.

2. Description of the Prior Art:

The prior art is replete with different mechanical and electrical systems indicating the position of the wheels to the operator of the vehicles. For example, U.S. Pat. No. 2,407,934, issued to F. W. Nilson, discloses an automatic direction indicator having a movable member being moved through a reduction gear by the steering gear shaft of the vehicle. The U.S. Pat. No. 1,582,069, issued to S. F. Nanna, discloses a circuit closing mechanism for direction signal having a connecting rod of the steering knuckles of the front or steering wheels having operative connection with a movable lever of electric switch operatively connected to the light signals. U.S. Pat. No. 3,673,561, issued to Bronstein, discloses a steering indicator including gearing to transmit rotation of the steering shaft of an automobile to a worm drive gear. U.S. Pat. No. 4,187,923, issued to McClure, III et al., discloses a cotton harvester with a hydrostatically steered rear guide wheel assembly provided with a steering arm having a raised horizontal segment which moves with the guide wheel. U.S. Pat. No. 2,934,035, issued to J. O. Hardy, discloses a steering indicator which is mounted on the steering wheel shaft. Movement of the steering wheel is translated into the rotation of an indicator mounted on the dashboard which informs an operator of the front wheel position.

However, none of the prior art references of record discloses the novel wheel position indicating system as specified in the subject invention.

SUMMARY OF THE INVENTION

It is an object of this invention to provide a vehicle with an indicating device informing a vehicle operator of an angular position of guide wheels relative to the rectilinear vehicle travel direction under any weather, terrain and light conditions.

Another object of the invention described and claimed herein is to provide a guide wheel position indicator system for a cotton harvester with a hydrostatic steering system, whereby an operator of the vehicle is constantly informed about a guide wheel position.

A further object of the invention is to provide a wheel position indicator system with electric circuitry wherein the circuit is completed by closing the negative ground side of the circuit without utilization of any switches.

Still another object of the invention is to provide a wheel position indicator system connected with a hydraulically actuated cylinder used for steering of guide wheels.

These and other objects of the invention are physically met in a vehicle, such as a cotton harvester, utilizing a hydrostatic steering system for controlling angular positions of the guide wheels. A hydraulic cylinder which is a part of the hydrostatic steering system is attached to a steering axle extending between guide wheels of the vehicle. A piston rod of the cylinder is connected to a link system interconnecting guide wheel pivot arms. Thus any movement of the piston rod of the cylinder causes a corresponding movement of the link system turning the guide wheels in one direction.

A pair of contact plates is mounted on and electrically insulated from the body of the hydraulic cylinder and electrically connected with battery powered indicator lights at an operator's station. A spring contact arm is attached to the piston rod of the hydraulic cylinder and movable therewith along the contact surface of the contact plates. When steerable guide wheels are in fore-and-aft alignment with the vehicle rectilinear travel direction a contact arm is centered between the contact plates. However, when the steerable wheel is off the center position at a predetermined angle correlative with a preselected interval between the contact plates, the spring contact arm contacts one of the plates thereby grounding the corresponding circuit through the steering axle and lighting the respective wheel direction lights. Thus, the operator is informed about the guide wheel angular position under any light, terrain and weather conditions.

Such indicator system significantly improves a harvester operation in view of the fact that inability to monitor guide wheel position can be a costly experience in lost time, high fuel consumption, and perhaps overloaded engine and transmission, resulting in downtime and high repair costs.

These and other objects of the invention will become apparent to those having ordinary skills in the art by reference to the following description, drawings and appended claims.

DESCRIPTION OF THE DRAWINGS

FIG. 1 is a schematic plan view of a cotton harvester chassis with a hydraulic steering cylinder mounted thereon;

FIG. 2 is an enlarged side view of the hydraulic cylinder taken substantially along the line 2—2 of FIG. 1;

FIG. 3 is a sectional view of the cylinder taken substantially along the line 3—3 of FIG. 2;

FIG. 4 is a end view of the cylinder taken substantially along the line 4—4 of FIG. 2;

FIG. 5 is a schematic diagram showing an electric circuit of the indicator system.

DETAILED DESCRIPTION OF THE INVENTION

Referring now to the drawings wherein reference characters designate like or corresponding parts throughout the several views, there is shown in FIG. 1 a chassis 10 of a vehicle, such as a cotton harvester, which comprises side beams 12 interconnected by a front transverse beam 14, rear cross member 16 and a cross member 18 which is positioned between the beam 14 and member 16. A pair of fixed parallel main drive wheels 20 supports the front end of the vehicle. Brackets 22 are welded to the cross member 18 and integrally attached to a vertical pivot shaft assembly 24 of a steering axle 26. Each end of the axle 26 is connected with a guide wheel 28 by means of a pivot arm assembly 30 which is rigidly attached to a link system 31. The link system 31 comprises a pair of guide arms 32 integrally affixed to the corresponding pivot arm assembly 30 and each of the guide arms 32 is extended longitudinally of the vehicle. The guide arms 32 are interlinked at the ball joints 35 by a connecting rod 34 extending parallel to the beam 14 and transversely of the vehicle chassis 10.

A double acting hydraulic steering cylinder 36 has a piston rod 38 which is attached to the guide arm 32 by means of a universal joint 40.

As best shown in FIGS. 1 and 2, an anchor end 42 of the cylinder 36 is pivotally secured to the steering axle 26 by a universal joint 44. A pair of hat-shaped support bridges 46 is mounted on the cylinder 36 at a predetermined interval therebetween. Each of the bridges 46 has outer flanges 47 extending outwardly thereof and contiguous with the body of the cylinder 36. Bridge hose clamps 48 protruding through bridge slots 49 and encompassing the cylinder 36 fasten the bridges 46 to the cylinder 36. Contact plates 50 and 51 are individually supported by and electrically insulated from the bridges 46 by insulator pads 52. Screws 53 attach plates 50, 51 to pads 52 and to bridges 46. Electrical ground leads 54 and 55 are attached to the plates 50, 51, respectively, by ground lead screws 56.

A spring contact assembly 58, as best shown in FIG. 2, includes a spring arm 60 which has a J-shaped contact end portion 62 depending from a middle portion 64 and a support portion 66 which also depends therefrom. The support portion 66 is welded to an attachment angle 68 which is fastened to a piston rod 38 by a hose clamp 70. An adjusting screw assembly 72 is mounted on a Z-shaped bracket 74 which is integrally secured to the support portion 66 and includes jam nuts 76 threadably engageable with the adjusting screw 77 to regulate tension in the spring contact arm 60.

As shown in FIG. 4, a housing 78 protecting the contact plates 50, 51 and contact arm 60 from dirt and atmospheric pollution is supported by a support strip 80 mounted on the anchor end 42 by means of a fastening screw 82. The strip 80 is connected to the housing 78 by its horizontal flange 84 and a screw 86. Another end of the housing 78 has slots 88 adapted to receive a hose clamp 90 fastening the housing 78 to the cylinder 36. Studs 92 connecting the cylinder with the vehicle hydraulic system are extended outwardly through the housing on one side of hydraulic cylinder 36 as best shown in FIGS. 3 and 4.

The ground lead 54, as shown in FIG. 5, is also connected to a right direction light indicator A and lead 55 to a left direction indicator B. Both indicators A and B are wired in parallel and energized by a vehicle battery 57 through electrical conduit C. The battery 57 is negatively grounded through an electrical conduit D.

In operation, when the vehicle moves foward with the rear steerable guide wheels 28 being in fore-and-aft alignment with front wheels 20, a contact end 62 of arm 60 is disposed between contact plates 50 and 51 with no contact therewith. When the guide wheels 28 interconnected by a link system 31 through pivot arms 30 are turned to the right at a predetermined angle correlated with an interval between contact plates 50 and 51, the piston rod 38 of the hydraulic cylinder 36 moves the contact arm 60 to contact the plate 50. This contact completes an electrical circuit by grounding the ground lead 54 and causing the wheel right direction indicator A to light, thereby informing a vehicle operator that the guide wheels 28 are positioned to steer the vehicle to the right. Similarly, if the guide wheels 28 are turned to the left at a predetermined angle, the contact arm 60 will contact the plate 51 thereby grounding the circuit to the wheel left direction indicator B and lighting it. Sensitivity of the indicator system to a wheel angle position can be regulated by the interval between the plates 50, 51.

The subject system significantly improves the harvester efficiency by enabling the harvester operator to constantly monitor guide wheels angular position under any light, weather and terrain (deep furrow, muddy ground, etc.) conditions, thereby saving crops from damage, decreasing fuel consumption, downtime and repair costs.

The foregoing description and drawings merely illustrate the invention and the invention is not limited thereto, except insofar as the appended claims are so limited, and so persons skilled in the art who have the disclosure before them will be able to make modifications and variations therein without departing from the scope of the invention.

What is claimed is:

1. An indicator system informing a vehicle operator as to an angular position of a vehicle guide wheel assembly relative to a vehicle rectilinear line of travel and comprising:

a hydraulic steering cylinder pivotally connected with an associated vehicle chassis, said hydraulic cylinder having a piston rod pivotally connected with said guide wheel assembly, first and second contact plates mounted on and electrically insulated from said hydraulic cylinder, said first contact plate disposed at one end of said hydraulic cylinder and said second plate at another at a predetermined interval therebetween, wheel right and left direction light indicators displayed at an associated operator's station and energized by a vehicle mounted energy source, said right and left direction light indicators being independently and electrically connected respectively with said first and second contact plates, adjustable spring arm means rigidly attached to said piston rod and reciprocably movable therewith for contacting one of said contact plates, whereby when the guide wheel assembly is positioned off the vehicle rectilinear travel direction at a predetermined angle said spring arm means will contact one of said plates thereby grounding a respective electrical circuit and the direction light indicators associated therewith which will be lit and inform the vehicle operator about the direction in which the vehicle is steered.

2. The indicator system in accordance with claim 1, and said guide wheel assembly comprising a steering axle pivotally attached to said vehicle chassis, pivot arm means comprising a pair of pivot arms each of them being pivotally connected to a respective end of said steering axle, said guide wheel assembly comprising a pair of guide wheels each of them being rigidly and respectively connected to one of said pivot arms.

3. The indicator system in accordance with claim 2, and said hydraulic cylinder having one end thereof pivotally anchored to said steering axle.

4. The indicator system in accordance with claim 2, and a link system interconnecting said pivot arms to synchronously steer said guide wheels in one direction, said link system comprising guide arms, each of them rigidly and individually connected to said pivot arms and pivotally interconnected by a connecting rod, and said piston rod moveable parallel to said connecting rod.

5. The indicator system in accordance with claim 1, and said adjustable spring arm means comprising a spring contact arm rigidly attached to said piston rod, and an adjusting screw means mounted on said arm for providing necessary tension therefor and facilitating better contact between said spring arm and said contact plates.

6. The indicator system in accordance with claim 5, and said adjusting screw means comprising a Z-shaped bracket threadably engageable and supporting an adjusting screw abutting said contact arm.

7. The indicator system in accordance with claim 1, and said contact plates individually supported by support bridges being removably attached to said hydraulic cylinder.

8. The indicator system in accordance with claim 1, said contact plates and said spring arm means covered by a housing being detachably attached to said hydraulic cylinder.

9. The indicator system in accordance with claim 8, and said housing having an inverted U-shape configuration.

10. The indicator system in accordance with claim 1, and said spring arm means comprising a spring contact arm having one end removably attached to said piston rod and another end slideably contacting one of said plates and movable within a preselected interval therebetween.

11. The indicator system in accordance with claim 10, and said contact arm having said another end of J-shape configuration.

12. In a cotton harvester having a chassis with an operator's station mounted thereon, front wheels and rear guide wheels interconnected by a steering axle a guide wheel position indicator system comprising:

hydrostatic steering means for controlling the position of guide wheels relative to the harvester rectilinear travel direction comprising a hydraulic cylinder pivotally attached to said steering axle, a pivot arm pivotally connected to each end of said steering axle and rigidly connected to the guide wheel, said pivot arms interconnected by a link system, said hydraulic cylinder having a piston rod pivotally secured to said link system in such a way that upon movement of said cylinder rod said pivot arms simultaneously move the associated guide wheels in the same direction, a pair of support bridges removably attached to said cylinder, a pair of contact plates individually and removably connected to said bridges at a predetermined interval therebetween, wheel right direction light indicator electrically connected to one of said contact plates and left direction light indicator independently connected to another, an adjustable spring contact arm removably and rigidly attached to said piston rod and reciprocably movable therewith for alternative contacting of said contact plates, whereby when the guide wheels are positioned off the harvester rectilinear travel direction at a predetermined angle correlated with said interval said spring arm means will contact one of said contact plates thereby grounding a respective electrical circuit and lighting the direction light indicator associated therewith to inform a harvester operator about a guide wheel angular position.

* * * * *